United States Patent [19]

Tsay

[11] 4,225,332
[45] Sep. 30, 1980

[54] ENERGY EFFICIENT POLLUTION ABATING GLASS MANUFACTURING PROCESS WITH EXTERNAL RECOVERY OF HEAT FROM FURNACE FLUE GASES

[75] Inventor: Quey T. Tsay, Pickerington, Ohio

[73] Assignee: Owens-Corning Fiberglas Corporation, Toledo, Ohio

[21] Appl. No.: 933,361

[22] Filed: Aug. 14, 1978

[51] Int. Cl.$^3$ ............................................. C03B 5/16
[52] U.S. Cl. .......................................... 65/134; 65/27; 65/135; 65/335; 106/DIG. 8
[58] Field of Search ................... 65/27, 134, 135, 335; 165/DIG. 12, 143, 144, DIG. 2; 106/DIG. 8

[56] References Cited

U.S. PATENT DOCUMENTS

| | | | |
|---|---|---|---|
| 2,634,555 | 4/1953 | Henry et al. | 65/135 |
| 3,607,190 | 9/1971 | Penberthy | 65/134 |
| 3,788,832 | 1/1974 | Nesbitt | 65/134 |
| 3,880,639 | 4/1975 | Bodner et al. | 65/134 |
| 3,953,190 | 4/1976 | Lange | 65/335 |
| 4,002,422 | 1/1977 | Escott | 432/99 |
| 4,026,691 | 5/1977 | Lovett et al. | 65/27 |
| 4,074,990 | 2/1978 | Brozowski | 65/136 X |
| 4,113,459 | 9/1978 | Mattmuller | 65/135 |

FOREIGN PATENT DOCUMENTS 7603720  2/1976  France .

Primary Examiner—Robert L. Lindsay, Jr.
Attorney, Agent, or Firm—Ronald C. Hudgens; Charles F. Schroeder; Robert F. Rywalski

[57] ABSTRACT

Disclosed is an improvement in glass manufacturing methods of the type which involve providing water containing agglomerates of glass batch, heating the agglomerates by direct contact with furnace flue gases so as to dry them and increase their temperature, the heating being insufficient however, to cause the agglomerates to aggregate, transporting those heated agglomerates to a fossil-fueled melter and melting them in the melter. The improvement resides in the heating being done in at least two stages, the flue gases withdrawn from one stage, heat recovered therefrom and then the cooled flue gases being introduced into the other stage. The heat withdrawn from the flue gases may be employed for beneficial purposes.

6 Claims, 1 Drawing Figure

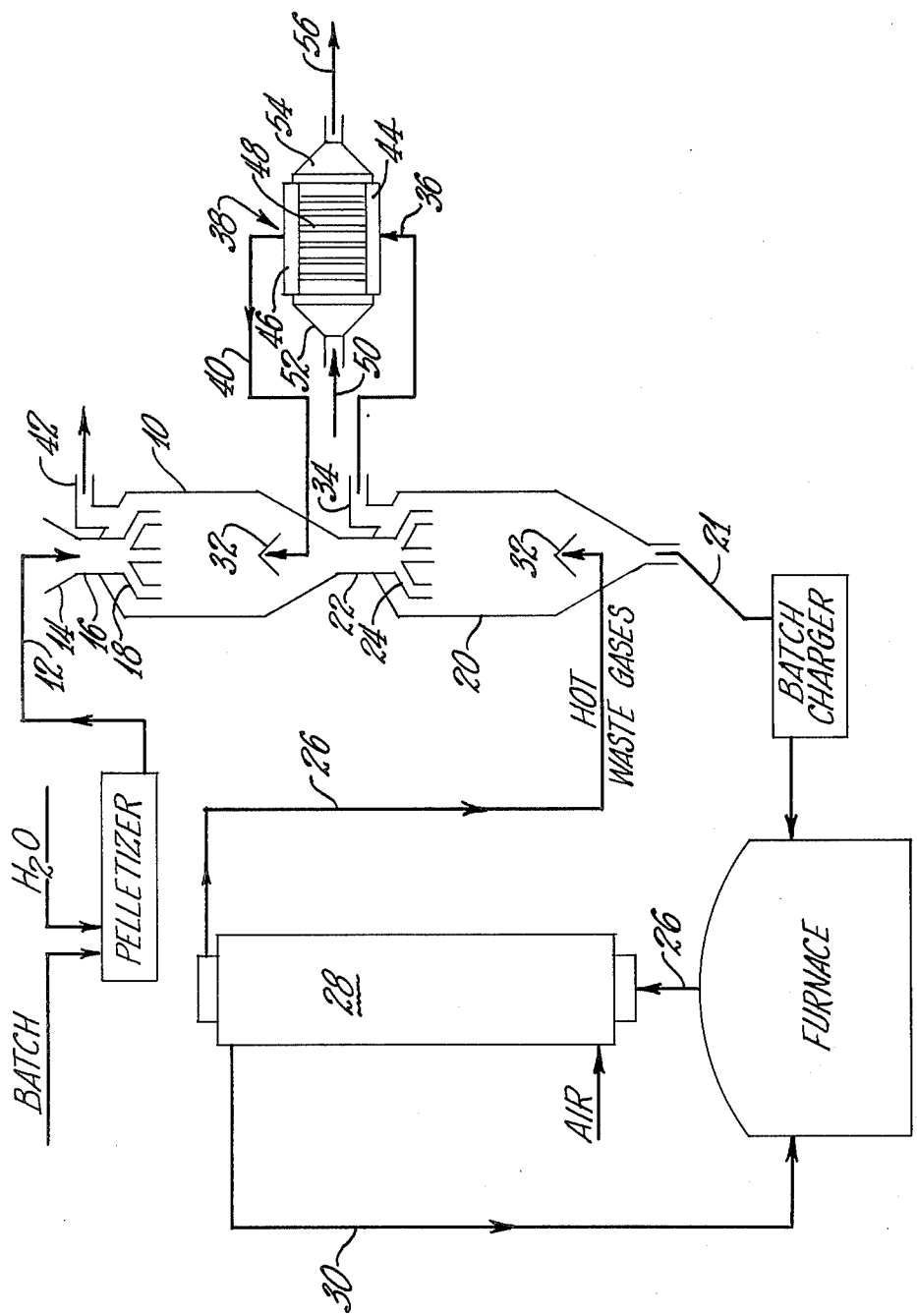

ENERGY EFFICIENT POLLUTION ABATING GLASS MANUFACTURING PROCESS WITH EXTERNAL RECOVERY OF HEAT FROM FURNACE FLUE GASES

THE INVENTION

The present invention relates to the art of glass manufacturing. More particularly, it relates to an improved pollution abating process which minimizes the amount of energy which is wasted by discharge to the atmosphere.

Methods are known in the art for manufacturing glass wherein glass-forming, batch ingredients are converted into agglomerates and these agglomerates then heated in a chamber by direct contact with flue gases from a glass melting furnace so as to produce non-aggregated, agglomerates which are then transported to a glass furnace for melting. These agglomerates are composite, integral, self-supporting masses consisting essentially of all these substantial batch materials and may take the form of balls, extrusions, discs, briquettes, and pellets. In copending application, Ser. No. 849,839, filed Nov. 9, 1977, and its parent applications, there is disclosed a process for making glass wherein free water containing pellets are discharged to a vertical bed contained within a chamber and furnace flue gases pass countercurrently to, and in direct contact with, downwardly moving pellets of the bed to dry and preheat them. In this manner volatile pollutants, or effluents in flue gases are extracted and recycled to the melter via the pellets and energy normally wasted in the flue gas it utilized to heat the pellets to an elevated temperature. Further exemplification of similar glass manufacturing methods may be seen in U.S. Pat. No. 3,880,639 and U.S. Pat. No. 3,788,832.

In instances of practicing the above copending application it has been observed that the flue gases leave the chamber, in which the drying and heating of the pellets is done, at a temperature which is relatively high. These flue gases leaving the heating chamber hence contain a significant amount of energy which is wasted. Additionally, another detriment of this is that the exiting temperature can be such as to preclude the maximization of pollutant recovery and recycle into the melting process. That is, if the temperature is too high a phase transformation of the gaseous polluting effluents in the flue gases, and their recovery, will not be suitably affected. In order to resolve the latter situation ambient air has been directly introduced into the chamber, as dilution air, for purposes of decreasing the temperature of the flue gases as they pass through a portion of the bed and exit from the heating chamber. This approach does not deal, however, with the matter of wasted energy and, furthermore, creates other undesirable problems. That is by introducing dilution air into the chamber the velocity of the gases flowing through the chamber is increased which in turn can create a dusting problem by which solid particles are carried out of the chamber in the exiting flue gas stream. This dusting obviously is detrimental from an environmental point of view and to resolve this problem requires large capital expenditures to effect the removal of such particles from the exiting flue gas stream.

In co-pending application U.S. Ser. No. 924,274, filed July 13, 1978 a solution to those problems is taught. In accordance with that application, applicants indirectly extract excess heat values from the flue gases passing through the bed by means of a heat exchanger positioned therein. Thus, the temperature of the flue gases exiting from the pellet heating chamber is maintained at a temperature so as to maximize the recovery of effluents from the flue gases and the excess energy which is extracted from the flue gases, and recovered by the heat transfer medium of the heat exchanger, is utilized for a beneficial purpose rather than simply being wasted by discharge to the atmosphere. While such technique has provided many advantages, there is still a need for certain improvements. As will be apparent, such a heat exchanger is subject to physical abuse and damage because of the forces exerted thereon by falling pellets as they are discharged into the bed. Thus, should repairs need to be made in the heat exchanger, or even a replacement made, because of the heat exchanger's location in the chamber bed, it is difficult, and expensive, to do so. In fact, this would require a long shut-down of the operation. Additionally, there is a need to improve the thermal efficiency of the heat transfer mechanism between the flue gases and the heat transfer medium since caking or coating of the heat exchanger will severely decrease the over heat transfer coefficient and cleaning of the surfaces of the heat exchanger is not expediently possible. Along the same lines, there is a need in such techniques to provide for an easier, or more responsive, control of the exiting temperature of the flue gases.

In accordance with the present invention, the above indicated needs are satisfied. That is, in accordance with the present invention, a method and apparatus is provided by which the temperature of the exiting flue gases can be much more easily controlled. Additionally, the heat exchanger is not subject to physical abuse and hence will provide for a longer operating life. The present invention also provides for improved thermal efficiency in the heat exchange mechanism and if need be the heat exchanger can be cleaned, repaired, or even replaced, in a significantly more expedient, and less costly manner.

Thus, in accordance with one feature of this invention, there is provided a method of manufacturing glass comprising: providing a first and second chamber each adapted to contain a bed of glass batch agglomerates, introducing glass batch agglomerates to said first chamber, and introducing glass batch agglomerates from said first chamber to said second chamber, introducing flue gases to said second chamber so as to heat said agglomerates therein, withdrawing said flue gases from said second chamber, recovering excess heat from said withdrawn flue gases, and introducing said latter flue gases after heat has been recovered therefrom to said first chamber so as to directly heat said agglomerates therein, withdrawing the flue gases from said first chamber and withdrawing heated agglomerates from said second chamber, then transporting the heated agglomerates to a fossil-fuel fired glass melter and melting the agglomerates therein. The heat which is recovered from the flue gases may then be used for numerous beneficial purposes such as, for example, the heating of curing ovens or even to maintain the temperature comfort of personnel in an office and/or plant.

In accordance with another feature of this invention, there is provided an energy efficient, pollution abating glass manufacturing apparatus comprising a combustion heated glass melting furnace, means for converting particulate glass batch into agglomerates, first chamber means and second chamber means each adapted to contain a bed of agglomerates and to allow heating of same by direct contact with combustion gases, means supplying agglomerates from said converting means to said first chamber, means discharging agglomerates from said first chamber to said second chamber, means directing combustion gases from said furnace to said second chamber, heat exchange means disposed outwardly of said chambers for recovering heat from said combustion gases, duct means directing combustion gases from said second chamber to said heat exchange means, duct means directing combustion gases from said heat exchange means to said first chamber and means supplying heated agglomerates from said second chamber to said furnace.

U.S. Pat. No. 3,607,190 discloses the direct preheating of particulate glass batch with furnace flue gases and combustion gases in a rotary inclined kiln and then uses those gases in indirect heat exchange relation with a particulate batch bed in a supply hopper for the kiln. The preheater (kiln) is operated to prevent water from condensing. U.S. Pat. No. 4,026,691, discloses a process in which glass batch pellets are supplied to a traveling bed-type heating vessel and from there to another chamber and thence to a glass melter; gases from the melter are shown in FIG. 1 to be supplied to the latter chamber, withdrawn therefrom, and then supplied to the traveling bed-type vessel and in turn withdrawn from that vessel. Netherlands Patent Application 77-01390 (based on French priority application 76-03720) discloses a glass melting process in which batch materials are compacted, passed to a dryer and in turn passed to a preheating column; flue gases from a furnace are directed to the preheating column, withdrawn therefrom, passed through a cyclone and a blower and then to the dryer. U.S. Pat. No. 4,002,422 discloses a packed bed heat exchanger containing, for example, iron oxide pellets which are to be treated with a hot reducing gas. That patent also discloses a cooling zone in the heat exchanger which includes a closed loop recirculating system with a heat exchanger, or cooler, disposed outwardly of the packed bed heat exchanger. As will be apparent, there is no recognition, or teaching, of the present invention in any of those documents.

The previously indicated and other advantageous features of this invention will be more apparent by reference to the drawing which generally schematically illustrates a preferred embodiment of this invention.

Referring to the drawing, particulate glass batch and a suitable liquid, preferably water, are converted into agglomerates, preferably pellets, by suitable means, preferably a rotary disc pelletizer. The amount of water employed will, of course, vary with the specific materials but, generally, water will be used in amount sufficient to form pellets containing between about 10% to about 20% by weight water and more desirably between about 15% and 17% by weight water. While not shown in the drawings, the pellets produced by the rotary disc pelletizer are most preferably supplied to a conventional screening device to select pellets having a nominal diameter of about $\frac{3}{8}''$ to about $\frac{5}{8}''$. Such pellets, or agglomerates, are then conveyed by suitable means to a first chamber 10 which is adapted to contain a packed bed of such pellets and to allow for direct contact with the pellets by furnace flue gases. This is done, and schematically represented, by conveying the pellets on a suitable conveyor 12, for example a belt conveyor, which discharges the pellets to a pellet receiving funnel or hopper 14. The discharge of funnel 14 communicates with a conduit 16 through which the pellets gravitationally fall, and the lower portion of the conduit 16 communicates with a spider type arrangement 18 by which the pellets are diverted into different flow channels and thereby are more uniformly distributed onto the bed of pellets (not shown) maintained within first chamber 10. The pellets in the bed of first chamber 10 generally move gravitationally downwardly and are discharged into a second chamber 20 by suitable means as, for example, conduit 22 and spider arrangement 24. Second chamber 20 is adapted and does maintain a pellet bed therein and is also adapted to allow for direct contact of the pellets by flue gases. The pellets of the bed (not shown) maintained in second chamber 20 also move gravitationally downwardly through the bed and discrete pellets at an elevated temperature are discharged from the bed and conveyed by a duct 21 into a batch charger which supplies the pellets to a fossil-fuel fired melting furnace. Flue gases, or combustion gases, from the melting furnace are directed by suitable duct means 26 to second chamber 20. Preferably, the flue gases emanating from the furnace 11 will first be passed through a recuperator 28 where they are cooled by indirect heat exchange with a stream of air 30 which in turn is supplied as combustion make-up air to the burners of the melting furnace.

The flue gases in duct 26 are introduced into second chamber 20, and the bed of pellets therein, by a suitable flow distributor for example a baffle type member 32 in the form of an inverted V. These flue gases then pass in countercurrent flow directly through the bed of pellets and are removed from chamber 20 by a suitable upwardly disposed outlet 34. Suitable duct means 36 direct the flue gases withdrawn from chamber 20 to a heat exchanger 38 which is disposed externally of first chamber 10 and second chamber 20. After heat has been extracted from the flue gases supplied to heat exchanger 38 the cooled flue gases are directed by suitable duct means 40 to first chamber 10 wherein they are distributed by an inverted V-type flow distributor 32 into the pellet bed to dry the pellets and heat them. The flue gases passing through chamber 10 similarly countercurrently and directly contact the pellets of the bed and exit chamber 10 through a suitable outlet 42. It is during the passage of the flue gases through chamber 10 that the majority of pollutants, which are recycled to the glass melter via the pellets, are extracted from those gases. While numerous heat exchangers may be employed in one embodiment of this invention there is contemplated a tubular type heat exchanger which includes a flue gas inlet manifold 44 in fluid communication with duct 36, a flue gas outlet manifold 46 in fluid communication with duct 40, and a plurality of tubular members 48 through which the flue gases flow. The heat transfer medium of heat exchange 38 is supplied via duct 50 into an inlet manifold 52 then through the heat exchanger 38, in contact with tubular members 48, and is removed through an outlet manifold 54 by means of a duct 56. While not shown, the heat in the heat exchange medium may be transported by duct 56 to any location for beneficial utilization of the energy therein. For example, if the heat transfer medium is air this air may be employed as combustion make-up air by being transported to the burners of a furnace. The heat transfer medium may likewise be transported to ovens for various purposes such as for curing binders and the like. If desired, the heat exchange medium may be employed for heating offices and the like. As will be apparent, the heat of the heat transfer medium may be recovered and employed for any of numerous heating purposes.

The above process and apparatus is ideally suited for manufacturing a wide variety of glasses but is especially well adapted for the manufacture of fiberizable textile glasses. Typically, these glasses are low alkaline metal containing glasses, for example glasses containing, if at all, less than 3% by weight of alkaline metal oxides and more typically less than 1% by weight. Exemplary of such glasses are the alkaline earth alumino-silicates where, for example, the cumulative amount of the alkaline earth oxides plus alumina plus silica is in excess of about 80% by weight and, quite commonly, in excess of about 90% up to, in some instances, virtually 100% by weight. Another exemplary textile glass is that commonly referred to in the art as an E-glass which may be categorized as an alkaline earth, boroaluminosilicate glass. The latter glass will typically comprise at least about 85% by weight, and more typically on the order of about 93–95%, of silica plus alumina plus alkaline earth metal oxides plus boric oxide. Other adjuvants which are typically present in E glasses include fluorine, iron oxide, titanium dioxide and strontium oxide.

Generally, the process of the present invention will be practiced with two general objectives in mind. First of all, it is desired that the agglomerates, or pellets, exiting from the second chamber be at as high a temperature as possible without forming an aggregated mass. That is, the agglomerates or pellets will remain as distinct masses in non-aggregated form. Thus, the temperature of these pellets will be less than their sintering temperature. Additionally, the amount of heat which is extracted, and recovered, from the flue gases in heat exchanger 38 will be such that the temperature of the flue gases after passing through chamber 10 will not be below the dew point of the water vapor carried in the flue gases. Desirably the temperature of the flue gases exiting outlet 42 will be so controlled by the amount of heat recovered in heat exchanger 38 that the temperature of these gases will be as low as possible; this will serve to condense, and collect, a maximum amount of gaseous polluting effluents in the gases. Yet the temperature will not be so low as to cause water condensation in the chamber. Those skilled in the art will realize that the control of the extent of heat transfer in heat exchanger 38, as by regulating the flow of the heat transfer medium therethrough, can be done quite easily by monitoring the gas temperature in outlet 42. Generally, the temperatures of the flue gases as they exit chamber 10 will be less than 275° F. and more desirably less than 250° F. with a temperature of about 200° F. being preferred. Suitably, the temperature of the hot pellets, or agglomerates, leaving second chamber 20 will be in excess of 300° or 400° C. but most desirably will be in excess of 500° C. and even 600° C.

Further exemplifying the present invention a standard E glass batch can be formulated using limestone, calcined colemanite (colemanite that has been heated above its decrepitation temperature), clay, flint, sodium silico fluoride and gypsum. This batch can then be converted to agglomerates in the form of pellets, preferably employing the technique disclosed in copending application U.S. Ser. No. 809,595 filed June 24, 1977. Pellets with a nominal diameter of $\frac{3}{8}''$ to $\frac{5}{8}''$ are then supplied to chamber 10 and unto a vertical bed therein. Pellets in the bottom of the bed, by means of the discharge 22, are supplied unto the bed in second chamber 20. Flue gases at a temperature of about 2600° F. are directed through a recuperator 28 where they are cooled to about 1400° F. and these gases, via duct 26 are supplied into second chamber 20. The gases will leave this chamber at about 1215° F. and are withdrawn and directed to heat exchanger 38 where they are cooled to about 470° F. The flue gases from which the heat has been recovered are then supplied by means of duct 40 into first chamber 10 where they serve to heat the pellets and dry them. Typically these gases will leave chamber 10 through outlet 42 at a temperature of about 200° F. Exemplary temperatures of the pellets leaving second chamber 20 which are then conveyed to the furnace for melting are on the order of about 1200° F. to about 1400° F. Typically, the temperature of the pellets discharging from first chamber 10 into second chamber 20 will be in the range of about 400° F. to about 470° F.

While the above sets forth the present invention, it will of course be apparent that modifications are possible which pursuant to the patent statutes and laws do not depart from the spirit and scope thereof.

I claim:
1. A method of manufacturing glass comprising:
   providing a first and second chamber each adapted to contain a bed of glass batch agglomerates,
   introducing glass batch agglomerates to said first chamber and introducing glass batch agglomerates from said first chamber to said second chamber, said batch agglomerates being formulated to produce a glass containing less than 3 percent by weight of alkaline metal oxides, and
   introducing flue gases to said second chamber so as to heat said agglomerates therein, withdrawing said flue gases from said second chamber, recovering heat from said withdrawn flue gases in a heat exchanger and introducing said latter flue gases to said first chamber so as to heat said agglomerates therein, withdrawing flue gases from said first chamber and heated agglomerates from said second chamber and melting said agglomerates.

2. The method of claim 1 and further including beneficially utilizing said recovered heat.

3. A glass manufacturing process comprising combining water and particulate, glass-forming materials into agglomerates for producing a glass containing less than 3 percent by weight of alkaline metal oxides, supplying said agglomerates to a first chamber unto the upper portion of a first bed of agglomerates in said chamber, supplying agglomerates from a lower portion of said first bed to a second chamber unto the upper portion of a second bed of said agglomerates in said second chamber, supplying agglomerates at an elevated temperature, but less than the sintering temperature of the agglomerates, from a lower portion of said second bed to a fossil-fuel fired glass melting furnace, introducing flue gases from said furnace into said second chamber, passing said flue gases through said second bed in direct contact with the agglomerates so as to heat said agglomerates in said second bed, removing said flue gases after passage through said second bed from said second chamber and while removed from said first and second chambers recovering heat from said removed flue gases with a heat transfer medium flowing in a heat exchanger, introducing said flue gases after heat recovery therefrom into said first chamber, passing said latter introduced flue gases through said first bed in direct contact with the agglomerates so as to remove water from the agglomerates of said first bed, removing said flue gases after passage through said first bed from said first chamber, and melting said agglomerates supplied to said furnace.

4. The process of claim 3 wherein said heat is recovered in a heat exchanger by air.

5. In a method of manufacturing glass comprising: providing water containing agglomerates of glass batch for producing a glass containing less than about 3 percent by weight of alkaline metal oxides, heating said agglomerates by direct contact with flue gases so as to dry them and raise their temperature, said heating being insufficient, however, to cause said agglomerates to aggregate and melting said heated agglomerates, the improvement wherein said heating is done in at least two stages, said flue gases being withdrawn from one stage, heat recovered therefrom in an external heat exchanger and then introduced to the other stage.

6. An energy-efficient, pollution-abating glass manufacturing apparatus comprising: a combustion-heated glass melting furnace, means for converting particulate glass batch into agglomerates, first and second chamber means each adapted to contain a bed of agglomerates and to heat same by direct contact with combustion gases, means supplying agglomerates from said converting means to said first chamber, means discharging agglomerates from said first chamber to said second chamber, means directing combustion gases from said furnace to said second chamber, heat exchange means disposed outwardly of said chambers for recovering heat from said combustion gases, duct means directing combustion gases from said second chamber to said heat exchange means, duct means directing combustion gases from said heat exchange means to said first chamber, and means supplying heated agglomerates from said second chamber to said furnace.

* * * * *